W. L. TRILL.
CONTINUOUS INDICATOR FOR ENGINES.
APPLICATION FILED NOV. 19, 1908.

1,028,154.

Patented June 4, 1912.

W. L. TRILL.
CONTINUOUS INDICATOR FOR ENGINES.
APPLICATION FILED NOV. 19, 1908.

1,028,154.

Patented June 4, 1912.
4 SHEETS—SHEET 2.

WITNESSES
R A Balderson
W.W. Swartz

INVENTOR
Wm L. Trill,
by Bakewell, Byrnes & Parmelee,
his Attys.

W. L. TRILL.
CONTINUOUS INDICATOR FOR ENGINES.
APPLICATION FILED NOV. 19, 1908.

1,028,154.

Patented June 4, 1912.
4 SHEETS—SHEET 3.

WITNESSES

INVENTOR

W. L. TRILL.
CONTINUOUS INDICATOR FOR ENGINES.
APPLICATION FILED NOV. 19, 1908.

1,028,154.

Patented June 4, 1912.

WITNESSES

INVENTOR

UNITED STATES PATENT OFFICE.

WILLIAM L. TRILL, OF CORRY, PENNSYLVANIA.

CONTINUOUS INDICATOR FOR ENGINES.

1,028,154.  Specification of Letters Patent.  Patented June 4, 1912.

Application filed November 19, 1908. Serial No. 463,406.

*To all whom it may concern:*

Be it known that I, WILLIAM L. TRILL, of Corry, Erie county, Pennsylvania, have invented a new and useful Continuous Indicator for Engines, of which the following is a full, clear, and exact description, reference being had to the accompanying drawings, forming part of this specification, in which—

My invention relates to improvements in engine indicators and it more particularly relates to continuous indicators in the use of which a series of diagrams are successively recorded upon a continuous strip or roll of paper.

The invention further relates to improvements by which indicator diagrams can be successively recorded upon a strip of paper of indefinite length.

The object of my invention is to provide an improved indicator which will record in a series of diagrams the successive strokes of an engine upon a continuous strip of paper, and an indicator which is also adapted to be used so as to secure all of the results obtained with the ordinary single short-card indicator.

Another object of my invention is to provide a continuous indicator by which diagrams can be taken of any number of strokes of the engine or covering any desired interval of time.

A further object of the invention is to provide improved means for rotating the drums by which lost motion in the drum-turning mechanism is prevented and is overcome, and another object of my invention is to provide improved means for adjustably securing the pencil arm piston of the indicator and for taking up wear and preventing lost motion in the arm connecting mechanism.

The invention consists in the arrangement and construction of the drums on the indicator and in the improved mechanism for rotating these drums.

The invention also consists in the improved means by which the end of the paper is secured to the marking drum and in the mechanism for starting and stopping the feeding of the paper on the drums.

The invention further consists in improved means by which the indicator is adapted for use both as a continuous indicator and as an ordinary indicator for making single indicator cards.

The invention still further consists in providing improved means for adjusting the pencil arm on the apparatus without disconnecting the pencil arm or removing the piston from the indicator cylinder.

In the drawings, 2 is a support upon which vertical posts 3 and 4 are rigidly secured in place, and removably secured on these posts are the rotatable marking drum 5 and winding drum 6, together with the drum-actuating mechanism, the respective drums being held in place by the knurled thumb-nuts 7 and 8.

On the top end of the drum 5 is a split projection 5$^b$ having tapering internal threads and a thumb-nut 5$^c$ having similarly tapering external threads is provided to expand the walls of the drum 5 after a roll of paper has been placed on the drum, so as to prevent slipping between the drum and paper and cause them to rotate together. An annular flange 5ᵈ on the nut 5ᶜ is employed to limit the distance the drum 5 can be expanded.

The drum 6 is provided with a cylindrical sleeve 6ᵇ which is split at one point along its entire length, the slot formed by splitting the sleeve 6ᵇ registering with the slot 6ᵃ in the wall of the drum 6. The sleeve 6ᵇ is provided to permit the roll of paper being removed from the drum 6, without the necessity of unwinding the paper from the drum 6, as the roll and sleeve 6ᵇ can be easily slipped endwise from the drum 6 when desired.

Rotatably mounted on the post 3 is a spur gear wheel 9 having an upwardly extending sleeve portion or hub 10, and mounted on the sleeve 10 is a rotatable friction disk 11. On the periphery of the disk 11 is a removable bushing or collar 12, by which the lower end of the marking drum 5 is attached to the disk 11. The lower end of the drum 5 is provided with a slot 13, which engages with the pin or projection 14, in the outside surface of the collar 12, and on the inner surface of the collar 12 is a groove or slot, which engages with the projecting pin 16 on the rim of the disk 11, so as to cause the positive rotation of the drum 5 with the friction disk 11. This disk is considerably smaller than the drum 5 and is arranged to receive a drum of a smaller diameter such as the drum 6 or the drum 6 may be removed from the position shown in the drawings and placed on this disk. The tubular sleeve 10 is screw-threaded for a portion of its length and on this threaded portion is a disk 17, having a series of downwardly projecting posts or legs 18. The legs 18 are hollow or tubular, and in the opening in the outer end of each of these legs is a friction pin or shoe 19, spiral springs 20 being employed to hold the pins or shoes 19 in engagement with the face of the disk 11 to frictionally drive the drum 5 when the gear 9 is rotated, this clutch being employed to frictionally drive the drum in both directions. A lock nut 21 on the screw-threaded portion of the tubular sleeve 10 is employed to hold the disk 17, which is also screwed on the sleeve 10, in its adjusted position. A spiral spring 22 is provided to cause the gear 9 and drum 11 to rotate in one direction, the inner end of the spring being attached to the upper end of the sleeve 10 and its outer end being fastened to the side of the spring cup 23, which is mounted on the vertical post 3 above the end of the sleeve. The spring cup 23 is turned, by hand, on the post 3 to vary the tension on the spring, and this cup is held in position by engagement with the shoulder on the post 3 and the thumb-nut 24.

Mounted on the post 4 is a spur gear wheel 25 having an upwardly extending tubular extension or hub 26, and rotatably mounted on the hub 26 above the gear 25 is a spur gear 27. The gear 27 has an upwardly extending cylindrical friction ring 28, to which the lower end of the winding drum 6 is secured, a pin 29 on the ring 28 and a slot 30 in the edge of the drum 6 being provided to cause the gear 27 to positively rotate the drum. A spiral spring 31 by which the drum 6 is caused to rotate in one direction is secured at its inner end to the upper end of the sleeve 26, the outer end of this spring being fastened to the side of the spring cup 33. The tension on the spring is adjusted in the same manner as is the spring 22 for the marking drum 5. A rocking arm 34 is movably secured in the friction ring 28, forming part of the gear 27, the ends of this arm contacting with the inner surface of the ring 28. The inner edge of the arm 34 engages with the apex formed by the inclined faces on the edge of the disk 35, which is secured on the sleeve portion 26 on the gear 25 and causes the arm 34 to bind against the inner face of the ring 28 and frictionally rotate the gears 25 and 27 together in the opposite direction to that in which the gear 25 is rotated by the coil spring 31. A washer or plate 36 is placed on the sleeve 26 to loosely retain the arm 34 in place and the washer 36 is secured in place by means of the screw-threaded nut 37. The ends of the helical spring 38 are secured to the arm 34 and to the pin 39 on the washer 36 to move the arm 34 into its operative position. The apex formed by the inclined faces 35′ on the disk 35 is so located as to form a cam which forces the ends of the arm 34 into contact with the friction ring 28 and rotate the gears 25 and 27 together in one direction, and to permit the gears 25 and 27 to rotate independently in the opposite direction.

40 is a gear which meshes with and causes the spur gears 9 and 25 on the vertical posts 3 and 4 to rotate together. This gear is mounted upon a post 41 which is adjustably secured in place upon the support 2 by the nut 42. Secured to the upper face of the gear 40 so as to rotate with it is a washer or disk 43, having a slot or groove 44, extending transversely across its upper face. Mounted on the post 41 above the gear 40 is a spur gear 45 which meshes with the gear 27 on the post 4 to which the drum 6 is secured. The gear 45 is provided on its upper face with a friction ring 46 and clutch jaws 47, 47, which are placed in the parallel-sided slot 44 in the washer 43. These clutch jaws are provided with suitable slots 48 in their lower edge which engage a flange on the friction ring 46. The clutch jaws 47 have one beveled side 48' to permit sidewise movement of the jaws in the slot 48, and cause the opposite sides of the slots in these jaws to bind upon the opposite faces of the friction ring 46 and rotate the gears 40 and 45 together in one direction on the post 41. When the clutch jaws are not held in their inoperative position by the clutch-operating mechanism, springs 49 on the washer 43 are provided to move the jaws 48 into their operative position and cause these jaws to bind upon the flange of the friction ring 46.

Journaled on the post 41 and connected to the washer 43 so as to rotate therewith is a flat washer 50, having the downwardly extending pins 51, arranged to engage the beveled faces 47$^a$ on the clutch jaws. Fixed on the post 41 is a flat washer 52 having depressions or grooves 53 in its upper face. A washer or disk 54 having a handle 55 by which it is shifted on the post 41 is provided with projections or knobs 56, 56, which are in the depressions 53, 53 on the washer 52 seated in one position of the clutch-operating mechanism. The washers or disks are held in place on the post 41 by a thumb-nut 57. The pins 51, 51 on the washer are arranged to contact with the inclined side 47$^a$ of the clutch jaws 47 when the handle 55 is thrown in position to move the projecting pins 51, 51 on the washer 50 out of the depressions 53 on the washer 52. When the pins 51 are in contact with the inclined side of the clutch jaws 47, the opposite side of these jaws 47 are held in contact with the side of the slot 44 in the washer 43, the jaws in this position permitting the gear 45 and its friction ring 46 to rotate independently of the gear 40 and washer 43 which is secured to the gear 40.

58 is a sleeve which forms part of the take up mechanism by which a constant tension is maintained on the strip of paper, which extends from the marking drum 5 to the winding drum 6, and by which variations in the surface speed of the coils of paper on these drums are permitted, is rotatably mounted on the vertical post 59 which is rigidly fixed on the support 2. An arm 60 is secured on the end of the sleeve 58 by means of the nut 59', and the outer end of this arm supports one end of the rod or shaft 61, on which the roller 62 is mounted, the lower end of the shaft 61 being inserted in the hole provided for that purpose in the spring cup 63 which is on the lower end of the tubular sleeve 58. Journaled on the sleeve 58 is a roller 64 which is provided to reduce the friction on the strip of paper which extends from the coil of paper or winding drum 6 and between the rollers 62 and 64 to the coil on the marking drum 5. The outer end of a spiral spring 65 is secured to the side of the spring cup 63 and the inner end of the spring is detachably secured to the post 59. The spring is adjusted by turning the sleeve 58 on the post 59 until the desired tension is secured, unwinding of the spring being prevented by means of the pin 66 on the support 2 which contacts with the head of the screw 67 in the side of the spring cup 63 (shown in Fig. 12).

The cylinder 68 for the indicator is removably secured in place in the cylinder holder 69, this portion of the holder being attached to the upper portion 70 of the holder by the connecting posts 71 so as to provide a gap or open space by which the indicator spring 72 is freely exposed to the atmosphere and is kept at a lower and more constant pressure than is possible with the usual closed type of cylinder and holder. The closed type cylinder and holder may be employed, however, instead of the construction shown, when desired. The cylinder 68 is preferably made removable to enable cylinders of different bores to be used on the indicator and which can be removed from and inserted into the holder through the open space or gap without dismantling the holder, although it may be formed integral with the holder. The lower end of the cylinder holder 69 is provided with the usual hand-nut 73 having handles 73$^a$ by which it is turned in securing the indicator to the indicator cocks provided for that purpose on the engine cylinder. The upper portion 70 of the cylinder holder is provided with an arm 70$^a$ by which it is secured to the drum support 2 and on the upper portion 70 of the cylinder holder, the support 74 for the indicator marking arm 75 is rotatably secured in place by means of the removable cylinder cap 76. A piston 77 is mounted in the cylinder 68 and is provided with a piston rod 78, the upper end of the rod 78 extending through a suitable hole provided in the cylinder cap 76 and being secured by adjusting screw 78' and the link 79 to the movable pencil arm 75 of the indicator.

Figures 1, 2:
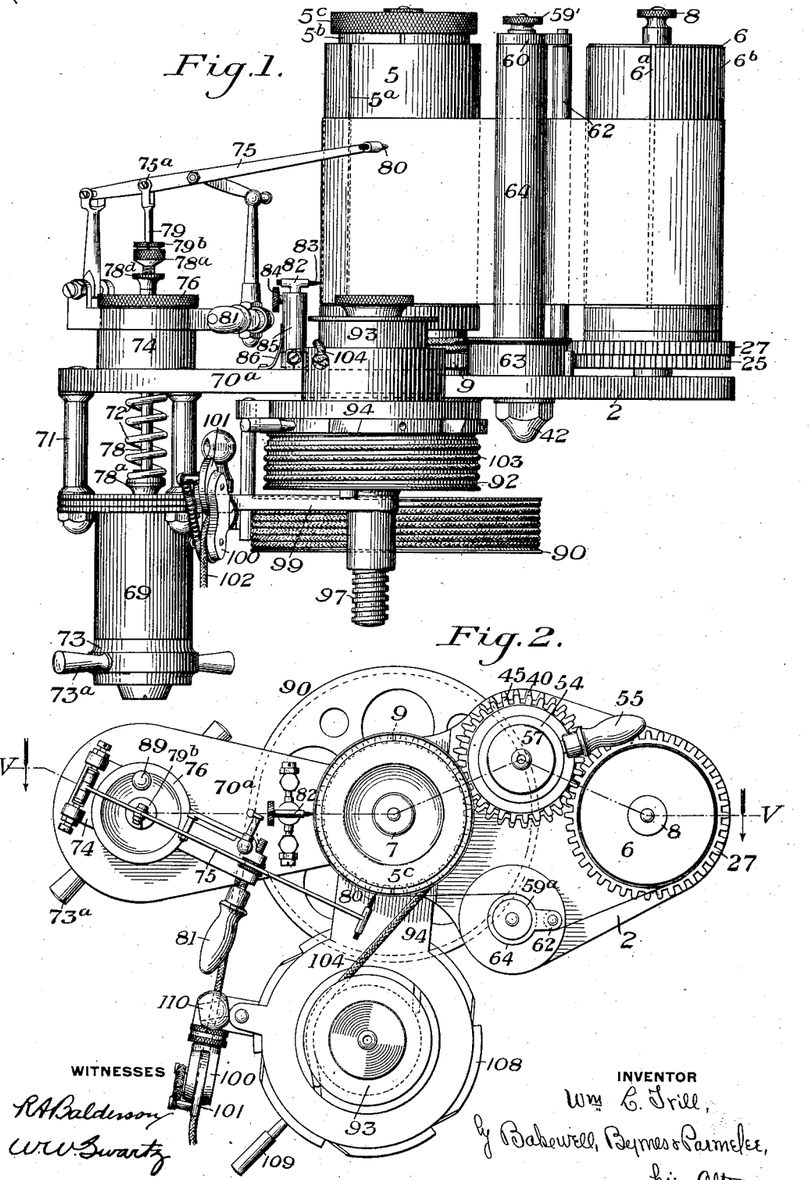
Figure 1 is a front elevation of my improved indicator.
Fig. 2 is a top plan view of the same.
Figures 3, 4:
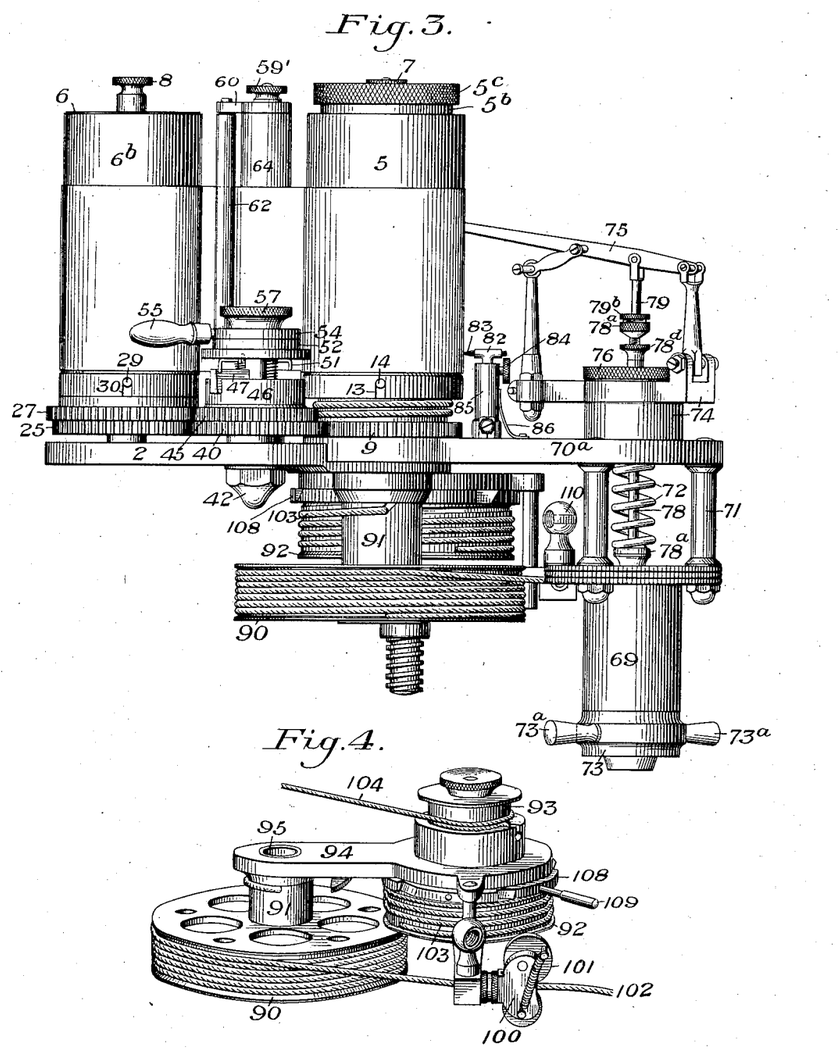
Fig. 3 is a rear elevation showing the gear clutch and clutch-operating lever.
Fig. 4 is a perspective view of my improved indicator reducing gear.
Figures 5, 6, 7, 8, 9, 10:
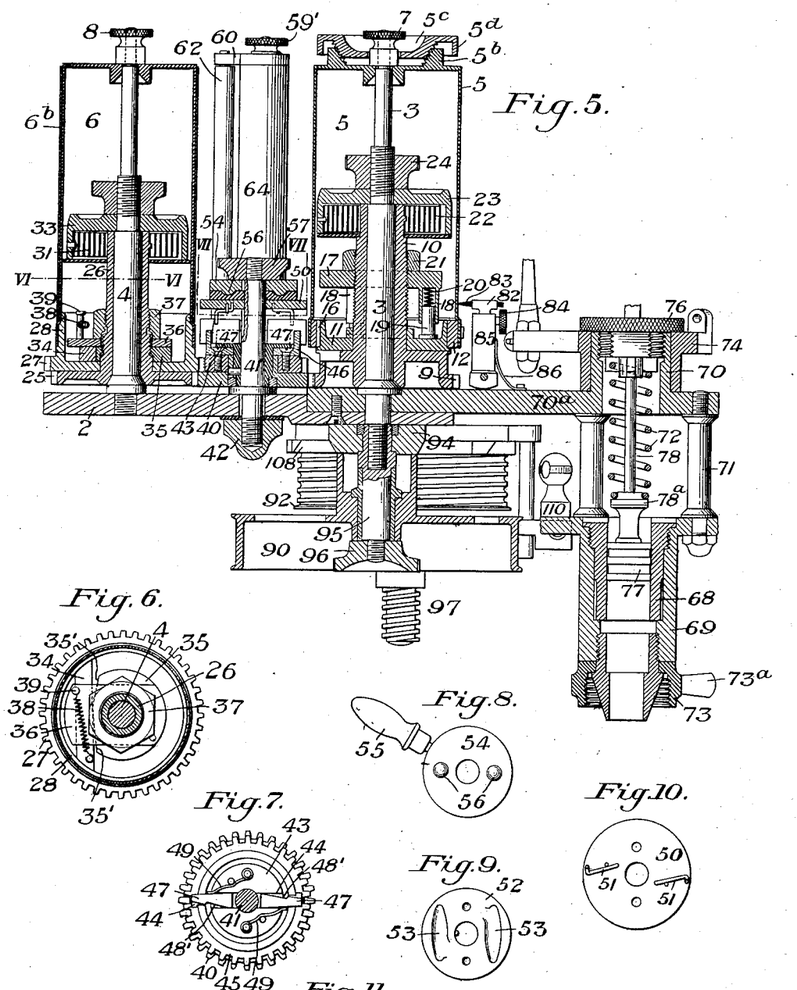
Fig. 5 is a sectional elevation on the irregular line V—V of Fig. 2.
Fig. 6 is a sectional plan view on the line VI—VI of Fig. 5.
Fig. 7 is a sectional plan on the line VII—VII of Fig. 5, showing the clutch mechanism on the differential gears connecting the winding and marking drums of the indicator.
Figs. 8, 9 and 10 are detail views of the operating mechanism for throwing the clutch shown in Fig. 7 into and out of its operative position.
Figure 11:
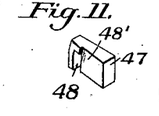
Fig. 11 is a perspective view showing a detail of the jaws for the clutch shown in Fig. 7.
Figures 12, 13, 14, 15, 16, 17, 18:
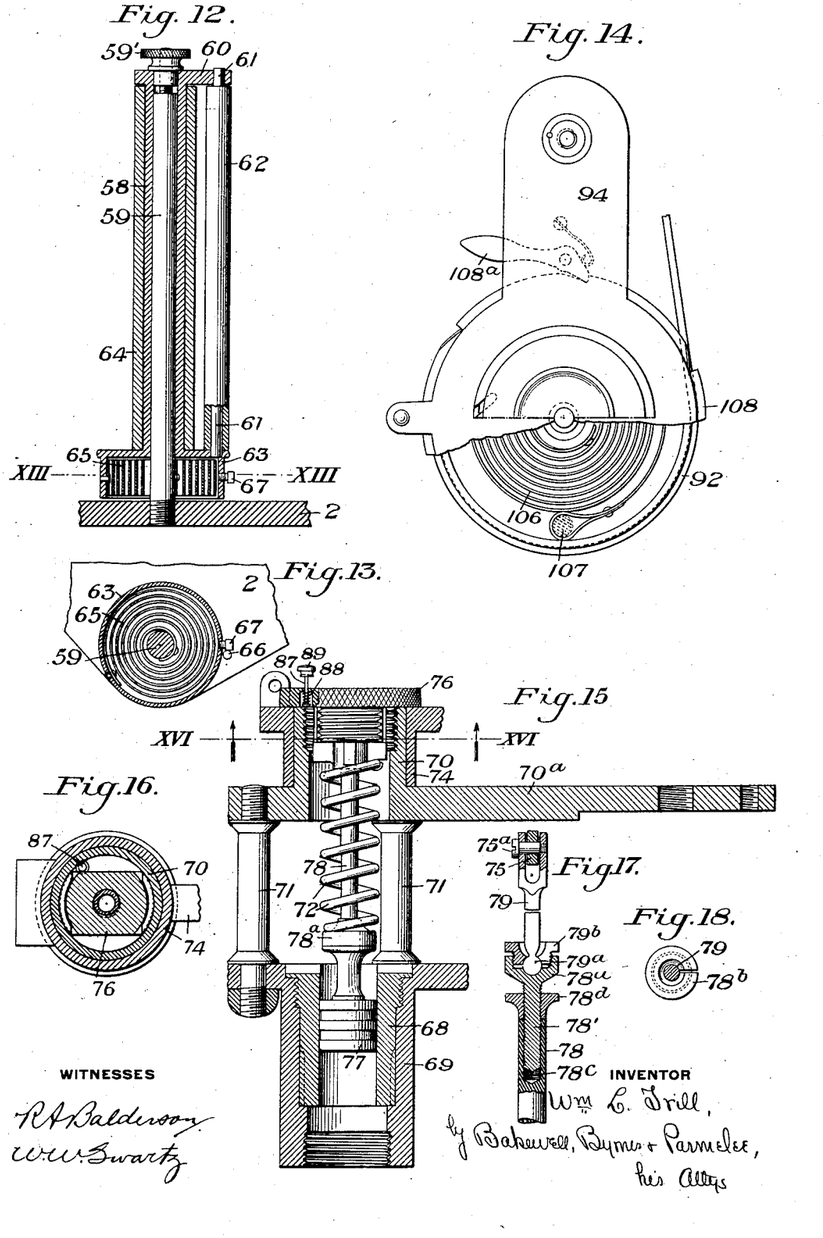
Fig. 12 is an elevation partly in section showing the mechanism for taking up the slack in the paper and keeping it at the desired tension on the drums.
Fig. 13 is a sectional plan view on the line XIII—XIII of Fig. 12.
Fig. 14 is a plan view of the reducing gear partly broken away to show the improved manner of attaching the ends of the spring-forming part of the reducing gear mechanism.
Fig. 15 is a sectional side elevation showing the cylinder for the indicator.
Fig. 16 is an inverted sectional plan view on the the line XVI—XVI of Fig. 15, showing the improved cylinder cap and showing the preferred means by which the cap is locked in place.
Fig. 17 is a longitudinal sectional view showing in detail the swivel connection by which the pencil arm is adjustably secured to the piston rod of the indicator.
Fig. 18 is a detail plan view of the nut forming part of the swivel connection shown in Fig. 17.

The pencil arm 75 is connected by the pin 75$^a$ to the forked upper end of the link 79, and the lower spherical lower end 79$^a$ of the link is secured in the socket or seat 78$^a$ located in the upper end of the adjustable piston rod extension 78' by means of the socket nut 78$^b$. The nut 78$^b$ is preferably split, as shown in Fig. 18, so as to permit of its being sprung over the ball end 79$^a$ of the link 79 and this nut is then screwed into the internally threaded ball socket 78$^a$ to form the swivel joint made between the link 79 and piston rod extension 78'. The link 79 may have a threaded lower end on which the ball 79$^a$ is screwed, in which case the nut 78$^b$ need not be split. The upper end of the piston rod 78 is tubular and is provided with internal screw threads 78ᶜ in which the screw threaded extension 78 is adjustably placed, the extension being locked in place in its adjusted position by the lock nut 78ᵈ. The indicator spring is secured by one end to the shoulder 78ᵃ on the piston rod 78 the opposite end of the spring being detachably secured to the cylinder cap 76.

The arm 75 is provided with a lead 80 which is moved into and out of contact and is held in contact with the paper on the marking arm, by means of the handle 81 on the arm support 74. The pencil arm 75 and its parallel motion, by which the pencil point 80 is caused to travel in a straight line vertically, may be of any preferred construction, and need not be further described. A second vertically movable pencil arm 82 having a lead 83 is adjustably secured by the thumb-screw 84 to the support 85, which is pivotally mounted upon the arm 70ᵃ by which the cylinder holder is secured to the drum support 2, and the point of the lead 83 is held in contact with the paper on the marking drum 5 and is caused to mark the atmospheric line upon the indicator cards by the spring 86.

The internal threads on the upper portion 70 of the cylinder holder are cut away at diametrically opposite points, and the threads of the cylinder cap 76 are also cut away at diametrically opposite points, to permit this cap to be quickly inserted in the holder, when a partial revolution of the cap will tightly secure the cap in position on the holder. A pin 87 which extends through a hole in the cap 76 engages with the threads on the holder 70 and forms a lock by which the cap 76 is prevented from moving or becoming loose in the holder, while the indicator is in operation. The pin 87 is held extended in its locking position by the spring 88 in the opening in the cap until such time as the pin is retracted by means of the nut 89 on its upper end. Instead of using the pin 87, spring 88 and nut 89 to lock the cap 76 in place, a threaded thumb-screw may be employed which will be screwed into a suitable threaded opening provided in the cap 76.

The wheel 90 and smaller wheel 91, which are formed integral, and the wheel 92 with the nest of removable bushings 93, forming the indicator-reducing gear, are mounted upon the arm 94, and this arm is detachably secured to the drum support 2 by the rotatable post 95, on which the removable wheels 90 and 91 are held by nut 96, the post 95, engaging with the threaded lower end of the vertical post 3. Upon the threaded lower end of the post 97 is a movable arm 99, on which a guide 100 and cam 101 are provided for the cord 102, one end of which cord is secured to the wheel 90, the other end being arranged to be attached to the cross-head of the engine to be indicated. The small wheel or drum 91 is connected by the cord 103 with the wheel 92, and the nest of removable bushings 93 has one end of the cord 104 attached to it, the other end of this cord being fastened to the drum portion of the wheel 9 on the vertical post 3. The cam 101 on the guide 100 is adapted to engage with the cord 102 and stop the indicator from operating. By turning the cam 101 to hold the cord in its unwound position and prevent its returning, the hook 102ᵃ on the end of the cord by which it is fastened to the cross-head of the engine will automatically disconnect itself from the cross-head. With short stroke engines, the wheels 90 and 91 are removed and the cord 103 is then connected with the engine cross-head, the guide 100 being removed from its former location and being placed in the opening in the post 110 which is provided on the arm 99 for that purpose. The roll of paper is placed in position on the marking drums and the thumb-nut on the top of the drums is then screwed down so as to expand the drum in the opening in the roll of paper and bend the paper on the drum so it will rotate with the drum. The strip of paper upon the marking drum 5 is gradually unwound from this drum, being gradually coiled upon the winding drum 6 as the successive diagrams are being made, and, to provide a smooth surface for the pencil point, a slot 5ᵃ is provided in the drum 5 to secure the end of the paper on this drum.

To adjust the reducing gear for use with the different engine speeds and prevent whipping of the cord on high speed engines, the reducing wheel 92 is provided with a coil spring 106, the inner end of which is secured to the hub of the wheel 92, so as to reduce the weight of the moving parts as much as possible. The outer end of the spring 106 is secured on the pin 107, which is provided upon the ratchet wheel 108 and the tension on the spring 106 is regulated by turning this ratchet wheel by the pin 109, which is inserted in the holes in the periphery of the ratchet 108. The ratchet wheel is held from being revolved by the spring by means of the detent 108ᵃ, which is pivotally mounted on the arm 94.

In the operation of my improved apparatus, the indicator is secured on the engine cylinder by means of the hand-nut 73. The roll or continuous strip of paper is coiled upon the winding drum 5, the inner end of this strip of paper being secured in a slot 5ᵃ in the side of the drum 5. The outer end of the strip of paper is passed around the roller 64 and between the rollers 64 and 62 and is then secured in the slot 6ᵃ in the winding drum 6, the sleeve 6ᵇ being first placed in position in the drum 6. Before the indicator is secured to the engine cylinder, the springs 22 and 31 on the posts 3 and 4 by which the drums are caused to rotate in one direction are adjusted by turning the spring caps 23 and 33 on the posts 3 and 4 to give the springs the required tension. The spring 106 on the reducing gear is also adjusted to the desired tension to prevent whipping of the cord, one end of which is connected to the cross-head of the engine. The outer end of the cord 102 is secured to the engine cross-head and when the cross-head has moved to unwind this cord from the drum 90, the eccentric 101 is thrown in its operative position to hold the cord in its unwound position and stop the rotation of the drums until such time as the cord is again attached to the cross-head by the operator. After the paper has been secured on the drums 5 and 6, the movable pencil arm 82 is adjusted to bring the lead 83 to the desired height to mark the atmospheric line on the indicator cards. The handle 55 is then thrown into position to throw the clutch mechanism on the gears 40, 45 in to its operative position. The cord 102 is then attached to the engine cross-head and the cam or eccentric 101 is then released to permit the cord 102 to oscillate the drum 90 on the reducing gear and through the connecting mechanism to rotate or oscillate the drums 5 and 6. The pencil arm 75 is then adjusted vertically by turning the screw threaded extension 78′ in the upper end of the piston rod 78 to bring the pencil point in the right position vertically in regard to the atmospheric line on the indicator cards and is locked in its adjusted position by the lock nut 78ª. The operator then moves the pencil arm 75 by means of the handle 81, so as to bring and hold the lead 80 in contact with the paper to record the diagram of successive strokes of the engine being indicated. The reducing gear is connected by means of a cord 108 with the drum portion of the gear 9, which is mounted upon the post 3, and causes the gear 9, and through the connecting gears 40, 45, the gears 25 and 27, to rotate. When the cord is moved by the reducing gear to cause the drum 5 to be rotated so as to unwind the paper from the drum 6, the gear 9 through the clutch mechanism connects this gear with the drum 5, rotates the drum in the opposite direction to that in which it is revolved on the return stroke of the engine by means of the spring 22. This forward movement of the drum 5 and the gear 9 causes the gear 40 to rotate clockwise and this movement of the gear 40 causes the clutch jaw arms 48 to engage the friction ring 46 on the gear 45 and frictionally rotate this gear. The gear 45 which meshes with the gear 27 causes this gear to rotate in the same direction as the gear 9 and through the gear 27 rotates the drum 6 in the same direction as the drum 5. The engine cross-head on its return stroke permits the springs 22 and 31 to rotate the drums 5 and 6 in the opposite direction to that in which they were first moved. When the drum 5 is revolved by the spring 22, the friction clutch moving the drum 5, the friction drum on the post 3 rotates the gear wheel 9 and this gear through the gear 40 rotates the gear 25 in the same direction as the gear 9. The gear 25 through the clutch mechanism on the tubular portion 26 of this gear causes the gear 25 to rotate with it. The apex of the inclined faces 35′ cause the clutch jaw 34 to engage with the friction face 28 of the gear 27 and rotates the drum in the same direction as the drum 5 and in the opposite direction to which it was first rotated. The drums 5 and 6 are arranged so as to rotate at different surface speeds at times, and when such is the case, a constant tension is maintained on the paper by means of a spring-actuated tension device formed by the rollers 62 and 64 between which the paper passes. When the surface speed of one drum exceeds that of the other, the roller 62 on the tension device will be caused to rotate about the post 59 so as to straighten the paper between the two drums; and when the relative surface speeds of the drums change, the movement of this roller 60 about the axis of the post 59, keeps the paper at the same tension irrespective of the speed of the drums or of the relative sizes of the roll of paper on the separate drums.

It will be noted that the friction clutch on the post 3 by which the drum 5 is rotated, operates in both directions, while the clutch for the drum 6, mounted on the post 4, is operative in one direction only, and that the clutch mechanism on the post 41, connecting the idler gears 40, 45 is also operative in one direction only. By means of this arrangement of the clutches and the gearing, I am enabled to wind a greater length of paper upon the drum 6 than is unwound on the return stroke of the engine cross-head when the clutch mechanism on the post 41 is in its operative position. In this way the paper is fed in a succession of steps by the successive strokes so as to be gradually wound on the drum 6 and unwound from the marking drum 5.

When it is desired to stop the continuous feed of the paper, the handle 55 on the clutch-operating mechanism mounted on the post 41 is thrown so as to move the clutch mechanism in its inoperative position. When this is done, the pins 51 projecting downwardly from the under surface of the washer 50 are thrown into engagement with the inclined face 47ª upon the clutch jaws 47 and hold the engaging faces of the clutch jaws out of contact with the flange of a friction disk 46. When the clutch is in this position, the drums are oscillated without any forward movement of the paper, the return stroke of the paper being the same as the advance stroke.

With short stroke engines, where the reducing wheel 90 is not necessary, the antifriction roller 100 and cam wheel 101, which are removably secured to the arm 99 on the reducing gear, are placed in position on the post 110, which is also secured on the arm 99, and in this case one end of the cord 103 on the drum 92 is attached to the engine cross-head.

With high speed engines there is great liability of whipping of the cord which is connected to the cross-head, and in order to prevent this whipping, the spring 106 on the reducing gear is adjusted by means of the ratchet wheel 108, and detent, so as to cause the cord to move on the return stroke at the same speed as that in which the cross-head is traveling.

The advantages of my invention will be apparent to those skilled in the art.

By the use of my improved indicator, I am enabled to take continuous indicator cards which record the successive strokes of the engine. By the use of the improved gear mechanism and friction clutch mechanism, the paper is automatically unwound from the marking drum to the winding drum or is oscillated between the two drums, without any forward movement of the paper, as is desired. By the construction and arrangement of the two drums, the apparatus may be used as an ordinary indicator when desired. By means of my improved tension device, the paper is kept taut at all times and any slack in the paper is prevented. The friction clutch mechanism allows the paper to be unwound from the marking drum and to be wound upon the winding drum at different speeds.

By the construction of the adjustable and universally movable connection between the piston rod and pencil arm, the pencil point can be adjusted in fixing the atmospheric line of the indicator diagrams without disconnecting the pencil arm or removing the piston from the cylinder of the apparatus. The universal joint and the adjustable piston rod extension permits all wear of the parts to be taken up and thereby prevents any lost motion and as any play in the joints will be multiplied several times at the pencil joints, insures more accurate diagrams being obtained. The apparatus is simple and is easily kept in repair.

Many changes may be made in the construction and arrangement of the parts without departing from my invention.

By removing the drum 5 and the filler or bushing 12 from the friction disk 11, and placing the drum 6 in position on the friction ring 11, the apparatus can then be operated in the same manner as the ordinary indicator, in taking single indicator cards, the apparatus operating in this way, as an ordinary single card indicator.

I claim:—

1. An engine indicator having rotary drums, means for oscillating said drums to transfer a continuous strip of paper coiled on said drums from one drum to the other, and a clutch connection between one of the drums and the driving mechanism arranged to frictionally drive said drum in both directions; substantially as described.

2. An engine indicator having rotary drums, means for oscillating said drums to transfer a continuous strip of paper coiled on said drums from one drum to the other, a clutch connection between one of said drums and the driving mechanism arranged to frictionally drive said drum in both directions, and a clutch on the other drum arranged to drive it in one direction; substantially as described.

3. An engine indicator having rotary drums, differential gearing for oscillating said drums to transfer a continuous strip of paper coiled on said drums from one drum to the other, and a frictional clutch connection between one of the drums and the driving mechanism arranged to frictionally drive said drum in both directions, the differential driving gear being arranged to rotate the drums a greater distance while moving in one direction than when moving in the reverse direction; substantially as described.

4. An engine indicator having rotary drums, a strip of paper supported on the drums, and means for oscillating the drums to unwind the strip of paper from one drum and wind it on the other drum; substantially as described.

5. An engine indicator having rotary drums, a strip of paper supported on the drums, means for oscillating the drums to unwind the strip of paper from one drum and wind it on the other drum, and a slot in at least one of the drums in which one end of the strip of paper is secured; substantially as described.

6. An engine indicator having two drums, a strip of paper supported on the drums, means for oscillating said drums to unwind the strip of paper from one drum and wind it on the other drum, and a take-up device in contact with a strip of paper and arranged to maintain a constant tension on said strip of paper; substantially as described.

7. An engine indicator having a marking drum, a winding drum, a strip of paper supported on the drums, differential gearing connecting the two drums, and means for oscillating said gears to unwind the strip of paper from one drum and wind it on the other drum and then rewind it on the last mentioned drum while unwinding from the first mentioned drum, the gears being arranged to move the strip of paper a greater distance in its forward movement than in the return movement; substantially as described.

8. An engine indicator having rotary drums, means for oscillating said drums to transfer a strip of paper coiled on said drums from one drum to the other, a clutch connection between one of the drums and the driving mechanism arranged to frictionally drive said drum in both directions, a strip of paper carried by said drums arranged to unwind from one drum and wind on the other drum, and a marking device controlled by the pressure in the cylinder of the engine to mark diagrams on said strip of paper; substantially as described.

9. An engine indicator having a drum which forms the carrier for a coil of paper, a marking device arranged to mark diagrams on the paper on said carrier drum, a winding drum upon which the paper is wound from the carrier drum, means to oscillate said drums, and a friction clutch connecting the carrier drum with the driving mechanism, the said clutch being arranged to drive said drum in either direction; substantially as described.

10. An engine indicator having two drums, a strip of paper supported on the drums, differential gearing for oscillating the drums to unwind the strip of paper from one drum and wind it on the other drum, said differential gearing being arranged to oscillate both drums in both directions; substantially as described.

11. An engine indicator having two drums, a strip of paper supported on the drums, differential gearing for oscillating the drums to unwind the strip of paper from one drum and wind it on the other drum, said differential gearing being arranged to oscillate both drums in both directions, and a clutch in said train of gears arranged to connect the gears so that the drums will oscillate an equal distance in both directions; substantially as described.

12. An engine indicator having two drums, a strip of paper supported on said drums, means to rotate said drums to unwind the strip of paper from one drum and wind it on the other drum, and a take-up device between the drums arranged to engage both sides of the strip of paper to maintain it under a constant tension; substantially as described.

13. An engine indicator having two drums, a strip of paper supported on said drums, means to rotate said drums to unwind the strip of paper from one drum and wind it on the other drum, a take-up device between the drums arranged to engage both sides of the strip of paper to maintain it under a constant tension, and means to adjust the tension to said take-up device; substantially as described.

14. An engine indicator having supports for two drums, and means whereby either of said drums may be mounted on one of said supports; substantially as described.

15. An engine indicator having a support for a marking drum thereon, and a winding drum, said winding drum being arranged to be used in place of the marking drum and as a marking drum; substantially as described.

16. In an engine indicator, a marking drum, a winding drum, and a tension device between said drums consisting of two rollers between which the paper is passed and a spring which controls the position of said rollers with respect to a line tangent to the said drums; substantially as described.

17. An engine indicator having two drums, a strip of paper supported on the drums, means for oscillating the drums to unwind the strip of paper from one drum and wind it on the other drum, said oscillating means being arranged to move the strip of paper a greater distance while moving in one direction than while moving in the opposite direction; substantially as described.

18. An engine indicator having two drums, a strip of paper supported on the drums, means for oscillating the drums to unwind the strip of paper from one drum and wind it on the other drum, said oscillating means being arranged to move the strip of paper a greater distance while moving in one direction than while moving in the opposite direction, and a marking device arranged to mark diagrams on the strip of paper; substantially as described.

19. An engine indicator having two drums, means for rotating the drums in one direction at certain relative speeds, and means for rotating the drums in the opposite direction at different relative speeds; substantially as described.

20. An engine indicator having a drum which forms the carrier for a coil of paper, and a marking device arranged to mark the diagrams on the paper on said carrier drum, the cylinder cap and cylinder holder on said marking device having mutilated threads whereby the cap is secured in said holder; substantially as described.

21. An engine indicator having a drum which forms the carrier for a coil of paper, and a marking device arranged to mark the diagrams on the paper on said carrier drum, the cylinder cap and cylinder holder on said marking device having mutilated threads whereby the cap is secured in said holder, and a lock by which the cap is locked in place in said holder; substantially as described.

22. An engine indicator having rotary drums, gearing connecting said drums, a friction clutch operative in both directions on one of said drums, and a clutch operative in one direction on the other of said drums for rotating the drums; substantially as described.

23. An engine indicator having a rotary drum, gearing for actuating said drum, and a plurality of friction clutches arranged to rotate said drums in opposite directions, when said gearing is actuated, substantially as described.

24. An engine indicator having a rotary drum gearing for actuating said drum, a friction clutch operative in both directions, and a second clutch operative in one direction connecting said gearing and drum, substantially as described.

25. An engine indicator having a rotary drum, gearing arranged to rotate the drum and a pair of friction clutches connecting said gearing and drum, one of said clutches being operative in rotating in both directions, the second clutch being operative in one direction, substantially as described.

26. An engine indicator having a piston rod operatively connected to a pencil arm, an adjusting mechanism for adjusting the arm relative to the piston rod, said adjusting mechanism comprising a universal joint, an adjusting screw and a lock nut for the adjusting screw; substantially as described.

27. An engine indicator comprising a support, a post on said support, a sleeve mounted on said post, a friction device arranged to oscillate said sleeve, a drum mounted on the sleeve so as to oscillate therewith, and means on the post arranged to hold the drum on the sleeve; substantially as described.

28. An engine indicator comprising a support, a post on said support, a sleeve mounted on said post, a friction device arranged to oscillate said sleeve, a drum mounted on the sleeve so as to oscillate therewith, and a nut on the post arranged to hold the drum on the sleeve; substantially as described.

29. An engine indicator having a pressure cylinder, a piston in said cylinder, a marking device connected to the piston, a cylinder holder adapted to receive cylinders of various dimensions, and a gap in said cylinder holder through which said cylinder can be removed and replaced; substantially as described.

30. An engine indicator having a pressure cylinder, a piston in said cylinder, a marking device connected to the piston, a cylinder holder adapted to receive cylinders of various dimensions, internal threads in the holder, external threads on the cylinder to engage the threads on the holder, and a gap in said cylinder holder through which said cylinder can be removed and replaced; substantially as described.

31. An engine indicator having a marking drum, a cord for actuating said drum, and a hook for connecting the cord to the engine, the hook being arranged to be automatically actuated by the hook engaging portion of the engine; substantially as described.

32. An engine indicator having a marking drum, a cord for actuating the drum, a hook secured to the cord for connecting the cord to the engine, a downwardly projecting member on the heel end of the hook arranged to be struck by the hook engaging portion of the engine to swing said hook, the arrangement being such that the hook will be tilted when the projection is struck; substantially as described.

In testimony whereof, I have hereunto set my hand.

WILLIAM L. TRILL.

Witnesses:
G. T. KINCAID,
A. B. FOSTER.

---

Copies of this patent may be obtained for five cents each, by addressing the "Commissioner of Patents, Washington, D. C."